(12) United States Patent
Rauh et al.

(10) Patent No.: US 6,987,863 B2
(45) Date of Patent: Jan. 17, 2006

(54) METHOD AND DEVICE FOR READING POSTAL ARTICLE INSCRIPTIONS OR DOCUMENT INSCRIPTIONS

(75) Inventors: Ingolf Rauh, Reichenau (DE); Walter Rosenbaum, Paris (FR); Matthias Krause, Orsingen-Nenzingen (DE)

(73) Assignee: Siemens AG, München ( * ) Notice: Subject to any disclaimer, the term of this patent is extended or adjusted under 35 U.S.C. 154(b) by 91 days.

(21) Appl. No.: 10/829,245

(22) Filed: Apr. 22, 2004

(65) Prior Publication Data

US 2005/0031163 A1    Feb. 10, 2005

Related U.S. Application Data

(63) Continuation of application No. PCT/DE03/02796, filed on Aug. 21, 2003.

(30) Foreign Application Priority Data

Aug. 29, 2002 (DE) ................................ 102 40 034

(51) Int. Cl.
*G06K 9/00*    (2006.01)

(52) U.S. Cl. ..................... 382/101; 382/321; 209/584; 358/496

(58) Field of Classification Search ........ 382/100–102, 382/106, 108, 113, 165, 140–141, 175, 179, 382/180, 181, 187, 189, 193, 200, 209, 220, 382/231, 232, 235, 236, 237, 274, 290, 305, 382/309, 321; 209/584, 3.3, 546; 361/683; 348/116, 333.8; 358/474, 498; 345/689, 345/32; 704/2; 705/8
See application file for complete search history.

(56) References Cited

U.S. PATENT DOCUMENTS 4,992,649 A  *  2/1991  Mampe et al. .............. 209/546

(Continued)

FOREIGN PATENT DOCUMENTS

DE          19624977 A1      1/1998

(Continued)

OTHER PUBLICATIONS

Derwent Abstract—DE19644163A1; May 7, 1998; Siemens AG, D-80333 München, Germany.

(Continued)

*Primary Examiner*—Daniel Miriam
*Assistant Examiner*—Seyed Azarian
(74) *Attorney, Agent, or Firm*—Siemens AG; Jacob Eisenberg

(57) ABSTRACT

According to the present invention, the recorded images with image-accompanying data of the postal articles or documents to be read of different customers are furnished. For each customer, master data are stored in a searchable manner. The master data includes at least the origin of the images, the range of the agreed services and, in a cost model, includes their costs according to established image attributes. Before each reading process, the respective customer and the respective reading job including the necessary image attributes are determined from the image-accompanying data are determined from the image-accompanying data and from the master data. After conducting the reading process, the customer, the procesing information concerning the reading steps with the reading and processing results, the established image attributes and the image-accompanying data are stored for each image in a searchable, sortable and time-related manner. Based on the cost model, the accruing costs are determined, are stored in a sortable manner according to types of service and/or according to service perious, and are output to each customer.

16 Claims, 5 Drawing Sheets

U.S. PATENT DOCUMENTS

| | | | |
|---|---|---|---|
| 5,031,223 A | * | 7/1991 | Rosenbaum et al. ........ 382/101 |
| 5,249,687 A | * | 10/1993 | Rosenbaum et al. ......... 209/3.3 |
| 5,287,271 A | * | 2/1994 | Rosenbaum ................... 705/8 |
| 5,497,319 A | * | 3/1996 | Chong et al. .................. 704/2 |
| 5,538,138 A | * | 7/1996 | Reich ......................... 209/3.3 |
| 5,966,457 A | * | 10/1999 | Lemelson ................... 382/141 |
| 6,292,709 B1 | * | 9/2001 | Uhl et al. ................... 700/226 |

FOREIGN PATENT DOCUMENTS

| | | |
|---|---|---|
| DE | 19644163 A1 | 5/1998 |
| DE | 69430472 T2 | 10/2002 |
| EP | 0635314 A1 | 1/1995 |

OTHER PUBLICATIONS

Derwent Abstract—DE69430472T2; Oct. 31, 2002; Pitney Bowes Inc.; US-Stamford, Conn., USA.

Derwent Abstract—EP0635314A1; Jan. 25, 1995; Licentia Patent-Verwaltungs-GmbH; D-60596 Frankfurt.

Derwent Abstract—DE19624977A1; Jan. 2, 1998; Siemens AG, D-80333 München.

* cited by examiner

METHOD AND DEVICE FOR READING POSTAL ARTICLE INSCRIPTIONS OR DOCUMENT INSCRIPTIONS

CROSS REFERENCE TO RELATED APPLICATIONS

The present application is a continuation of international application PCT/DE2003/002796, filed Aug. 21, 2003, which designated the United States and further claims priority to German application DE 10240034.2, filed Aug. 29, 2002, the both of which are herein incorporated by reference.

BACKGROUND OF THE INVENTION

The invention relates to a method and a device for reading postal article inscriptions and document inscriptions.

For automatic processing, for example sorting, of postal articles or documents, it is necessary to read their inscriptions. In the case of postal articles for example, the image of the postal article surface is first of all recorded according to the prior art, or an image of the address section of the postal article is recorded specifically. The image data is then transferred to a first OCR system for address identification, and possibly to further OCR systems for alternative address identification and to video coding systems if the upstream OCR systems cannot identify and code the address. If the address has been read, the OCR or video coding system passes appropriate sorting information to the sorting machine, in order that it can sort the postal article appropriately. The postal article in this case has a sorting or identification code (ID code) sprayed onto it. In this case, the sorting information need not be identified during the sorting process (on-line), but may also be carried out with a time delay, via the ID code (off-line). In this case, the letter is first of all provided with a unique ID code, which is subsequently linked to the identified address information. The OCR and video coding system is in this case coupled to the sorting machines via LAN or WAN networks. This also allows the remote operation of a reading and video coding center, which is responsible for two or more machines, and even for two or more machine locations. Such remote reading and video coding centers are already in use, but are invariably operated by the respective postal service itself. When the postal article traffic fluctuates severely, the postal service has to provide extensive reading equipment, which is utilized only at times.

SUMMARY OF THE INVENTION

The invention is therefore based on the object of providing a method and a device for reading postal article inscriptions or document inscriptions, which reduce the necessary reading complexity for the individual postal services, or for other services which use corresponding reading processes.

In this case, the images are supplied from different customers together with the data accompanying the images relating to the postal articles or documents to be read. Core data relating to each customer (postal service or other service) is stored such that it can be searched and contains at least the source of the images, the scope of the agreed reading steps and further services as service types and, in a cost model their costs, on agreement as a function of defined image attributes. The respective customer and the respective reading task including the image attributes which are required for cost determination are determined before each reading process, from the data accompanying the images, and from the core data. The customer, the processing information relating to the reading steps together with the reading and processing results, the determined image attributes and the data accompanying the images are stored such that they can be searched and sorted on a time-related basis after carrying out the reading process for each image. The costs incurred are determined from the cost model contained in the core data by means of the stored data relating to the reading processes carried out, and are stored such that they can be sorted on the basis of service types of the cost model and/or on the basis of time periods, and are output as invoices based on defined sorting criteria for each customer.

For more efficient operation, the postal services and other services are therefore provided with the capability to carry out the reading and coding tasks by outsourcing. In this way, at times when the postal article traffic is uncertain, fixed costs are converted to variable costs, and the service automatically profits from new technical developments in the reading and coding sector, and is independent of the life of the hardware and software used for this purpose. The operator of centralized reading functions, on the other hand, can provide this service for two or more services and customers, and furthermore, can likewise achieve saving effects. This makes it possible for the operator to provide, to verify and to invoice the reading and coding operation as a function of the concluded service layer agreement, the data accompanying the images and the quality and nature of the images transmitted. In this case, the service may be provided at the same time for two or more services, that is to say for different image data streams and with separate invoicing for each service.

Advantageous refinements of the invention are described in the dependent claims.

By way of example, it is advantageous for the service types which are contained in the core data to be prioritized with regard to the processing including agreed processing time period for the customers. It is thus possible to take account of different service agreements with the various services/customers, and their importance.

It is also advantageous for the stored data to be processed statistically with the results from the service types carried out, corresponding to evaluations defined in the core data, and to be output to the customers as reports for the defined time periods.

In order to identify the source of the images to be read, it is advantageous to include tags for the image-producing devices in the data accompanying the images, which tags are in turn associated with the individual customers.

It is also advantageous for the images and the reading results to be associated with the postal articles or documents by means of identification tags, which are applied legibly to the postal articles or documents. The addresses which are read on the postal articles are advantageously output as address codes which are verified by means of address directories.

The invention will now be explained in more detail in the following text, using an exemplary embodiment and with reference to the drawings. This example relates to the reading of postal article inscriptions in the course of sorting and distribution processes in the Post Office, although this does not imply any restriction.

DETAILED DESCRIPTION OF THE INVENTION

The method requires data storage, checking, searching, comparison, sorting and other data manipulations which are made possible by the use of a computer system. This computer system may be programmed appropriately by specialist personnel. A computer system in this case comprises one or more computers with known components, such as a memory, an input interface, an output interface, a processor, software and communication. Two or more computers can split the task between themselves by means of appropriate networking. The network may in this case be a local LAN or WAN.

Figure 1:
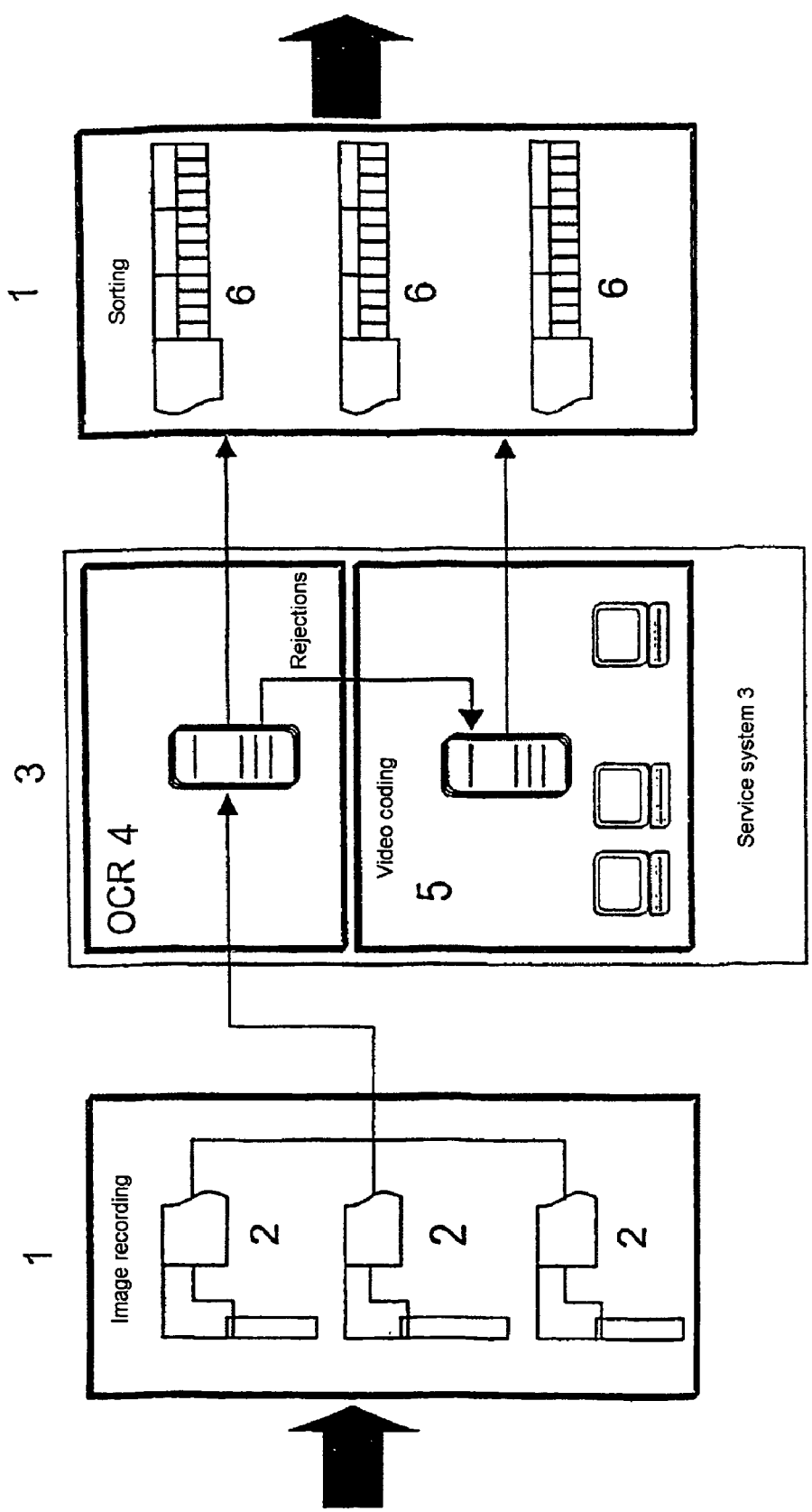
FIG. 1 shows the dataflow between one of the postal services with image recording equipment and a reading device with OCR and video coding device as a service system.

FIG. 1 shows the dataflow of an image with associated information. The image is generated by an image recording appliance 2, which is located on a sorting machine, or by a camera if the customer 1 is a postal service, and is then transmitted via a LAN or WAN link to the service system 3 for reading the postal article inscriptions, together with information accompanying the images. In the service system 3, the inscription is read by means of OCR devices 4 and, if they do not produce a unique result, it is read by means of a video coding device 5, and the result is passed back as sorting information to the postal service, as the customer 1, for the purpose of correct automatic sorting.

Figure 2:
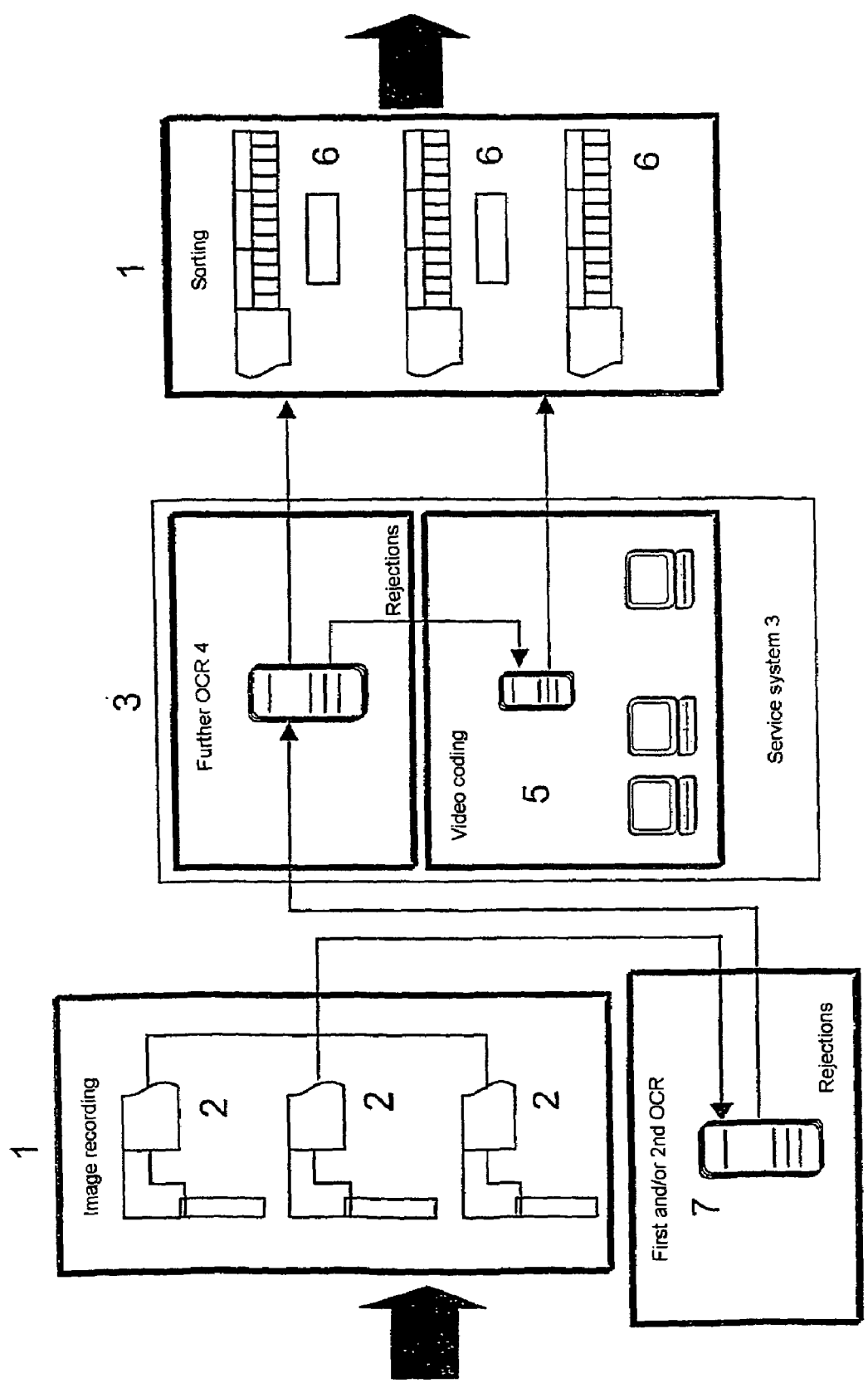
FIG. 2 shows the dataflow between one of the postal services with image recording equipment and OCR, and the reading device with OCR and video coding device as a service system.

FIG. 2 shows another option which comprises the service being reduced to the reading (OCR and video coding) of images which the postal service, as the customer 1, has not been able to read using its own OCR devices 7. In this case, a first or even second OCR device 7 of the postal service, as the customer 1, reads the address or other postal article information. If no result is found in this process, the image is transferred to the service system 3. An OCR device 4 installed here now attempts to read the image using alternative algorithms. If this is unsuccessful, the image is video-coded. The sorting result is then passed back again to the postal service, as the customer 1, for sorting.

Figure 3:
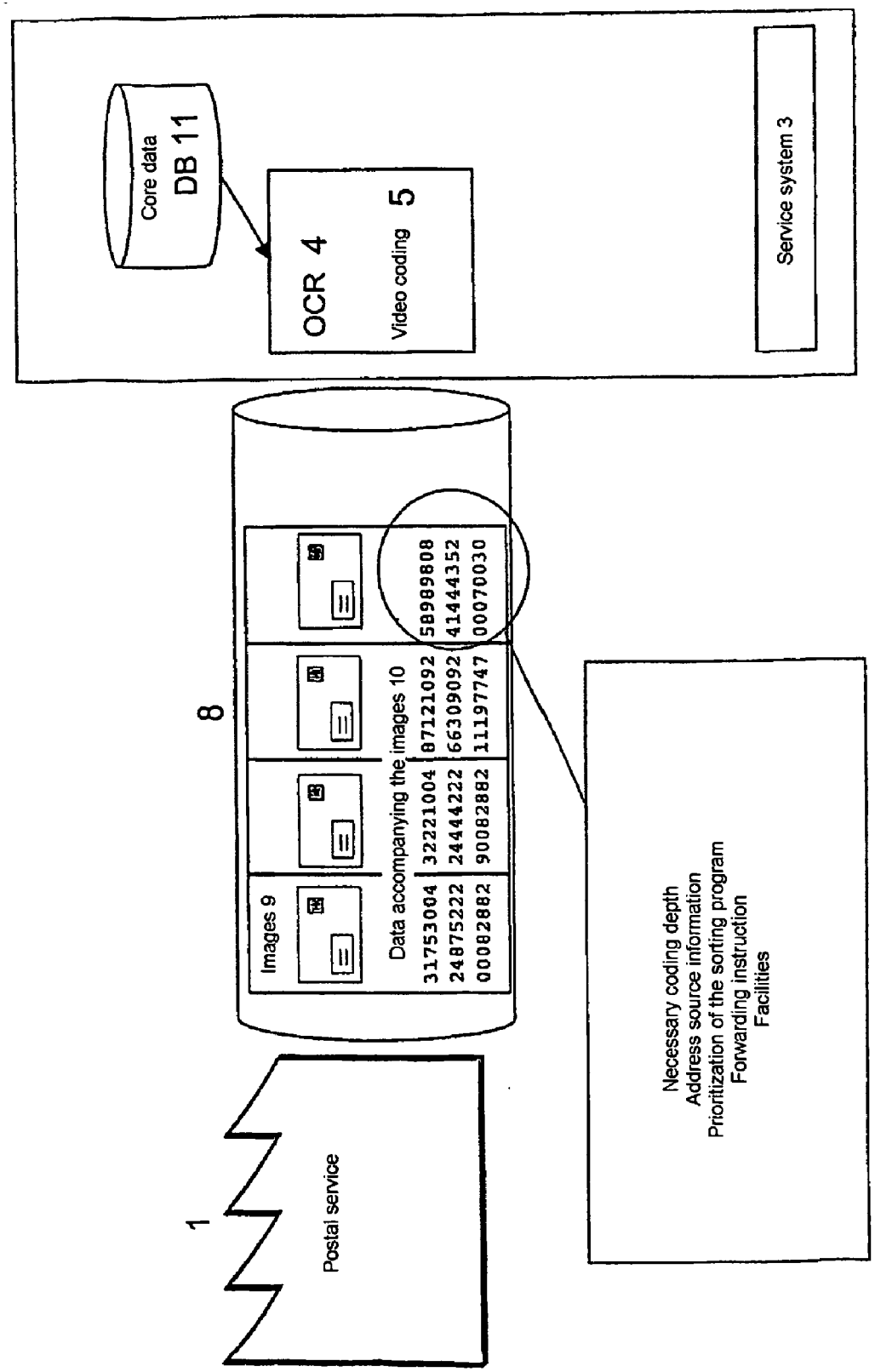
FIG. 3 shows the interface between a postal service and the reading device.

FIG. 3 shows the interface between one of the postal services, as the customer 1, and the service system 3. In this case, a data protocol 8 is passed via the interface, and contains both images 9 in typical image compression format (tiff, jpg, etc.) and data 10 accompanying the images. In this case, the protocol may be designed such that the data 10 accompanying the images is transmitted in a form applicable to two or more images 9, or such that the data 10 accompanying the images is transmitted for each image 9, as is shown in the drawing. The data 10 accompanying the images may now be used in order to carry out the reading process optimally for the service task by means of the OCR device 4 and video coding device 5, based on the service layer agreement SLA. A further option is for the postal service, as the customer 1, to have the capability to order special service functions with data 10 accompanying the images for individual postal articles or quantities of postal articles, for example the automatic return of forwarding information as sorting information. The data 10 accompanying the images is used, in compliance with the service layer agreement, for invoicing to the postal service as the customer 1.

Typical data 10 accompanying the images comprises descriptions of the sorting environment or additional orders, such as:

unique number of the sending machine/image recording appliance of the postal service only sender sorting/read postcode necessary sender and receipt sorting/complete read address necessary time interval within which a sorting result must be available postal article priority automatic forwarding processing etc.

This data is typically produced by the respective postal service's computer system, for example by the first OCR device 7 or by the machine controller for the sorting machine.

The data 10 accompanying the images together with the core data 16 which is stored in a core data databank 11 in the service system 3, as well as the information from the image 9 control the service procedure and determine, for example, which coding tasks are necessary, and with what priority. The core data 16 is in this case typically:

associations between a machine identification and the postal services association between the machine identifications and language areas (for example, French, German) in the country of the postal service (for example in multilingual countries)

scope of the service layer agreement required quality of service machine configurations for passing on the results (off-line coding)

prioritization of the service layer agreement in comparison to the service layer agreements of other postal services.

If, for example, it is found that the sorting machine which is sending the postal article information with an image is located in a French-speaking part of a country, then French-speaking, trained video forces receive the images for carrying out the identification task. If the service layer agreement does not allow separate payments for high-priority and low-priority postal articles, then the postal articles are not given any priority despite appropriate information in the data accompanying the images.

After processing in the service system 3, the data 10 accompanying the images is used together with the core data 16 for calculation of the service fee and for verification of the service quality.

Figure 4:
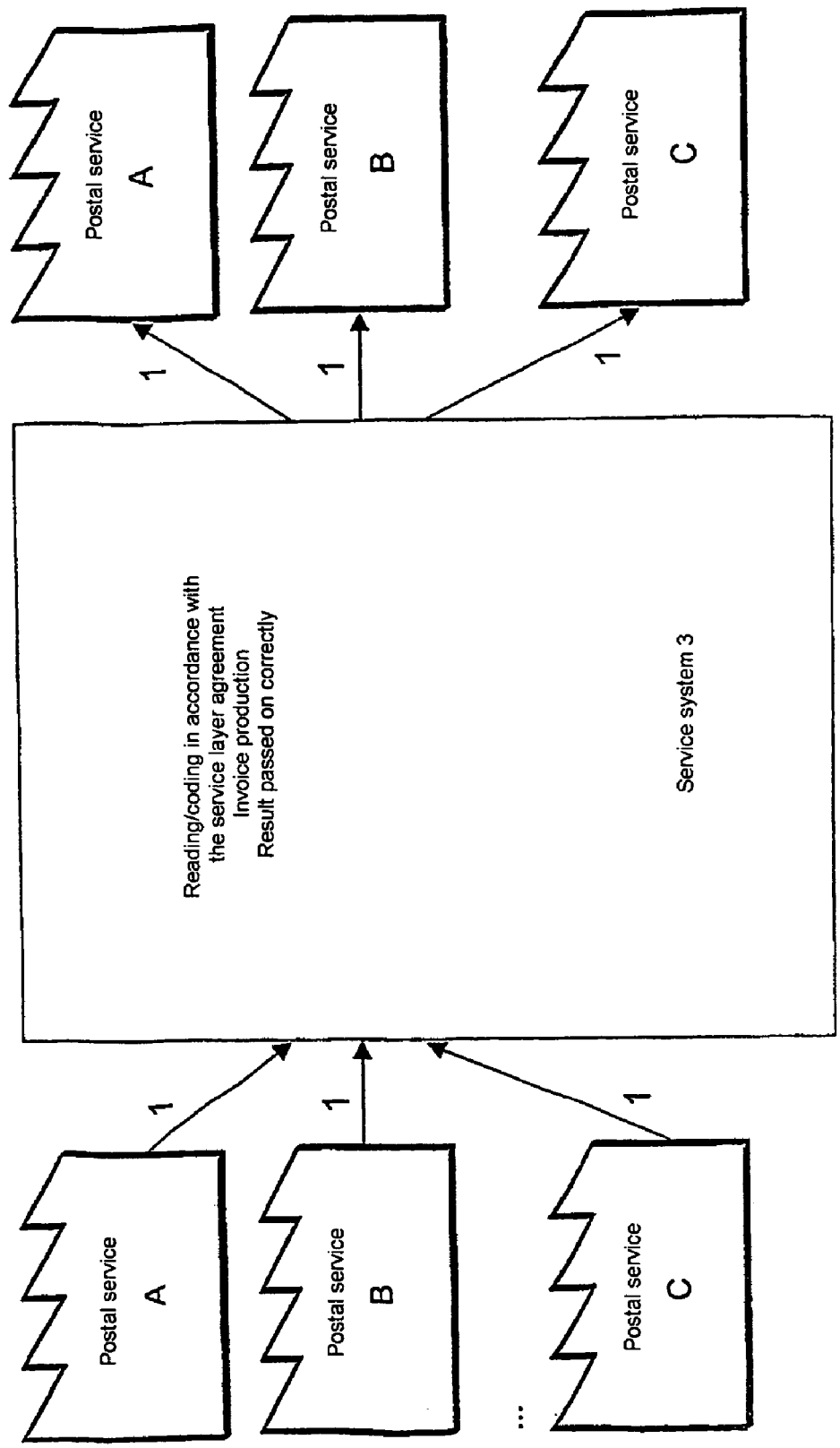
FIG. 4 shows the dataflow and process sequence within the reading device.

As can be seen from FIG. 4, the service system 3 can be designed to carry out reading processes for various postal services A, B, C as the customer 1. In this case, the method for the service must ensure that the postal article information (images 9 and data 10 accompanying the images) sent by the respective postal service 1 leads to the result being passed back again to the correct customer 1.

Figure 5:
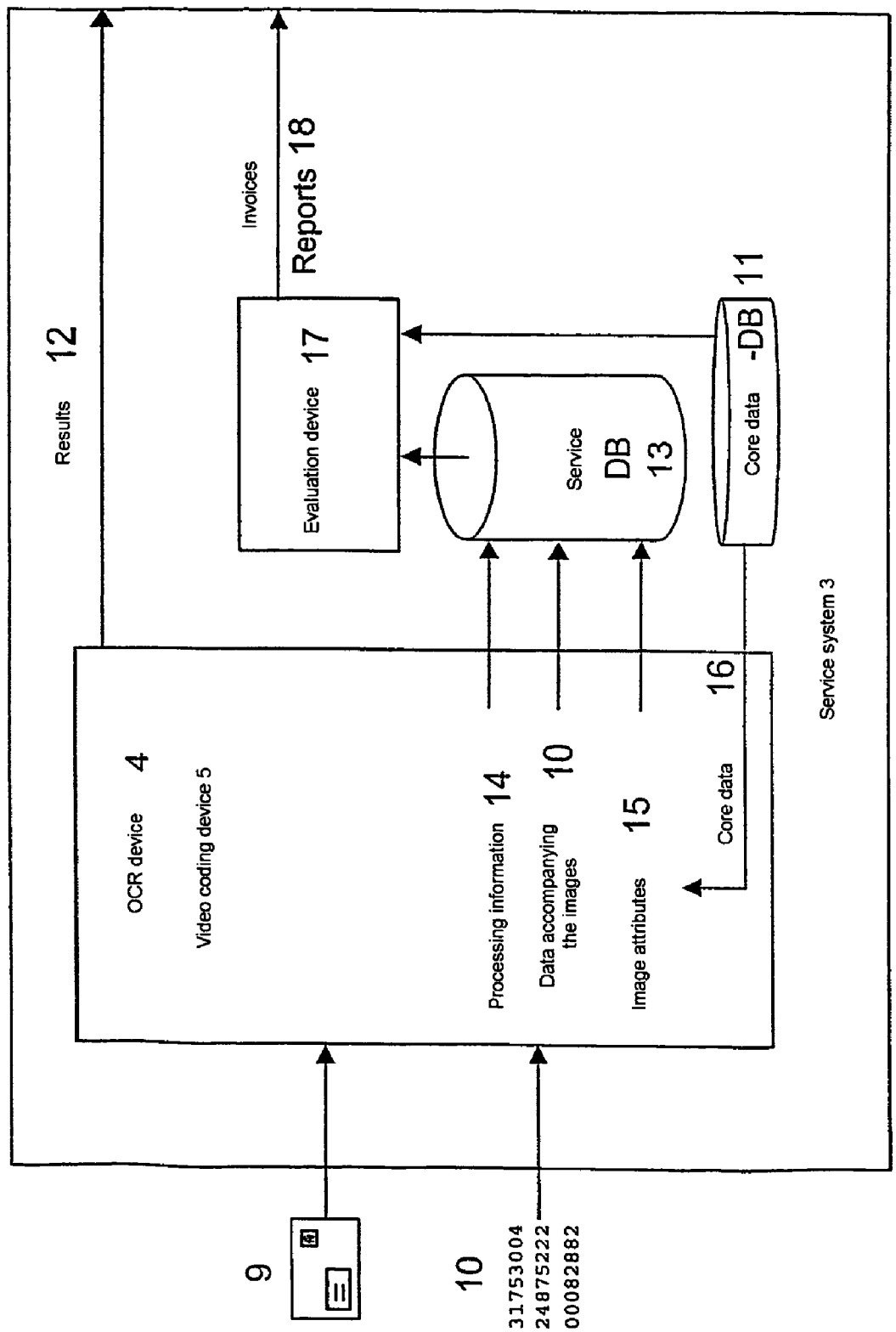
FIG. 5 shows in detail, the dataflow within the service system.

FIG. 5 shows, in detail, the dataflow within the service system 3: the service system 3 receives all of the images 9 and the data 10 accompanying the images from one postal service, or from two or more postal services in parallel, as the customer 1. The OCR device 4 and the video coding device 5 process the images 9 controlled by the data 10 accompanying the images, and controlled by the core data

16, from the core data databank 11, on which the service layer agreement is based. As already described above, the required reading or coding step is activated, and the processing is prioritized, on the basis of the data.

The reading and coding result 12 is passed back in the form of sorting information/an address code or in some other form of the reading result to the relevant postal service 1. These need not be the same machines as those from which the images 9 and the data 10 accompanying the images originally came. In the course of the off-line coding process described above, the reading and coding results 12 can also be passed back to a different sorting machine for the postal service as the customer 1, controlled by the core data 16 in the core data databank 11. If it is not possible to read and video-code the image 9 automatically (for example if no video coding service is offered), the image 9 may also be passed back as the result 12 in order that, if appropriate, the postal service can task its own video coding personnel with the reading of the image. After the reading process, the data 10 accompanying the images is entered in a service databank 13, and is used as the basis for documentation and invoicing. Information can be stored as follows in the service databank 13:

- number of letters relating to a data item accompanying an image
- unique letter Ids (identifications) for the data item accompanying the image
- order delivered at the same time (for example forwarding, input coding, etc.)
- information for the processing process (result of the postal service OCR, priority of the postal articles in the post process, etc.)
- identification of the supplying machine
- time window for on-line or off-line processing Processing information 14 relating to all the reading/processing steps is likewise supplied to the service databank 13, having the following information for this purpose:

- name/type of reading/processing step
- number of images for this reading/processing step
- date/time of the reading/processing step
- optionally: duration of the processing step
- result of the reading/processing process.

Reading/processing steps may be:

- receipt of the data
- sender coding by the 2nd OCR
- input coding by the 2nd OCR
- sender coding by interactive video coding based on the determination of the "Region of Interest" (zone on the image where the address information is located)
- input coding by interactive video coding based on determination of the zip code (post code)
- input coding by complete video coding
- forwarding coding by the 2nd OCR
- etc.

In parallel with the processing information 14, the service databank 13 also receives information about the respective image characteristic and quality as a so-called image attribute 15. The image attributes 15 are likewise used to verify the quality of service and are the basis for invoicing.

Typical image attributes 15 may be:

- handwritten addresses
- machine-written addresses
- dark envelope
- window envelope
- priority note
- electronic release
- no postage stamp
- redirection address
- incomplete address
- etc.

The service databank 13 stores the information as follows:

- unique identification (identification number) of the postal article
- characteristics of this postal article.

Another option for storage of the data would be:

- characteristic of a postal article
- counter for the number of postal articles with this characteristic.

An evaluation device 17 uses the data from the service databank 13 to produce reports and invoices 18. This is done by accessing the core data 16 in the core data databank 11.

It uses all of the machine identifications entered there for a postal service as the customer 1 to determine from the processing information 14, the data 10 accompanying the images and the postal article attributes 15 the complete scope of the service provided, and matches this to the contractually agreed service layer agreement, stored as core data 16 in the core data databank 11. All of the services that are provided and those that are not provided can now be documented in comparison to the requested services and, for example, may be presented in the form of a statistical evaluation report.

This includes, for example:

- actual reading rate and required reading rate
- actual response time and required response time
- actual failure time and required failure time
- actual range of postal articles (percentage distribution of postal article attributes per 1000 or more postal articles) and contractually agreed postal article spectrum as the basis of the service
- actual reading rate per postal article attribute, and the required reading rate per postal article attribute, etc.

The core data databank 11 furthermore receives information about contractually agreed payments for services provided. The services provided are defined by the processing information 14 relating to the reading/processing steps carried out, the postal article attributes 15 and orders in the course of the data 10 accompanying the images.

These payments may be stored in the following form in the core data databank 11:

- costs per image read
- costs per handwritten address rate
- costs per missing postage stamp identified
- costs per image which has been processed by the 2nd OCR and by the video coding system
- costs per image which has been processed only by the 2nd OCR,
- costs per forwarding address
- costs per image which was coded on dispatch
- costs per image which was coded on receipt,
- or a supplement for a different range of postal articles.

The evaluation device 17 uses the core data relating to agreed payments, the information 14 relating to the reading/processing steps actually carried out, determined postal article attributes 15 and transmitted data (order data) 10 accompanying the images to determine the invoice amount for the service provided per customer, that is to say per postal service 1. In this case, this is added up over the time period for which the service is provided.

Both the reports relating to the provision of the service and the invoicing 18 may be transmitted to the respective postal service 1 in electronic form or in physical form (by means of a print-out).

It should be stated that the detailed procedure described above may be varied within the scope of the invention. In particular, the result of a reading and coding task need not necessarily be a sorting result and, in fact, the service may also relate to other features associated with a postal article (postage stamp identification, sender identification, etc.) or to images of documents outside the postal field (forms, signatures, etc.). The organization and composition of the databanks may also differ from the example described above, while observing optimization processes for the databank. However, this difference does not call into question the inventive essence of the system, of carrying out a reading task in accordance with a service.

We claim:

1. A method for reading postal article inscriptions or document inscriptions, comprising the steps of:
    recording an image of the postal article or document;
    automatically reading the image with a single-stage or multistage process OCR devices;
    if reading results are not complete or unique, reading the images by coding forces in at least one video coding device, the device comprising two or more video coding stations which receive the images via a distribution device, the images being transmitted to the OCR devices and to the video coding devices together with data accompanying the images in order to carry out the step of reading with data relating to reading conditions and additional tasks;
    supplying images from different customers together with data accompanying the images and relating to postal articles or documents to be read,
    storing core data relating to each customer such that it can be searched, the data including at least a source of the images, the scope of the agreed reading steps and further services as service types and, in a cost model, their costs as a function of defined image attributes,
    determining before each reading process, from data accompanying the images and core data, respective customer and respective reading task including image attributes which are required for cost determination,
    storing customer processing information relating to reading steps together with reading and processing results, determined image attributes, and data accompanying the images, such that they can be searched and sorted on a time-related basis after carrying out the reading process for each image,
    determining costs incurred from a cost model included in core data by means of the stored data relating to the reading processes carried out,
    storing the determined costs such that they can be sorted on the basis of service types of the cost model and on the basis of service time periods, and
    outputting the determined costs as invoices based on defined sorting criteria for each customer.

2. The method according to claim 1, further comprising the step of prioritizing the service types which are included in the core data with regard to processing including agreed processing time period for the customers.

3. The method according to claim 1, further comprising the steps of:
    statistically processing the stored data with results from the service types carried out, the results corresponding to evaluations defined in the core data, and
    outputting the statistically processed data to the customers as reports for the defined time periods.

4. The method according to claim 1, wherein tags of the image-producing devices are stated in the data accompanying the images as the source of the images, and are in turn associated with the individual customers.

5. The method according to claim 1, wherein the images and the reading results are associated with the postal articles or documents by means of identification tags.

6. The method according to claim 1, wherein the address codes which have been verified by means of address directories are output as reading results of addresses.

7. A device for reading postal article inscriptions or document inscriptions by means of image recording devices, OCR devices and, if reading results are not complete or unique, at least one video coding device comprising two or more video coding stations at which the images which have not been successfully OCR-read and are assigned by a distribution device are read and coded by coding forces with the images being transmitted to the OCR devices and to the video coding devices together with data accompanying the images in order to carry out the reading tasks with the data relating to reading conditions and additional tasks, comprising:
    means for supplying the images from different customers together with data accompanying the images and relating to postal articles or documents to be read,
    means for storing core data relating to each customer in a core databank such that it can be searched, the data including at least a source of the images, the scope of the agreed reading and processing steps, and further services as service types and, in a cost model, their costs on agreement as a function of defined image attributes,
    means for providing an evaluation device which determines a respective customer and respective reading task, including image attributes which are required for cost determination before each reading process, from the data accompanying the images and from the core data,
    means for storing in a service databank the customer and processing information relating to the reading and processing steps together with the reading and processing results, the determined image attributes and the data accompanying the images such that they can be searched and sorted on a time-related basis for each image,
    means for determining costs incurred in the evaluation device from the cost model contained in the core data databank by means of the stored data relating to the reading processes carried out,
    means for storing the costs such that they can be sorted on a basis of cost model service types and service time periods, and
    means for outputting the costs as invoices based on defined sorting criteria for each customer.

8. The device according to claim 7, wherein the evaluation device is designed such that the stored data is processed statistically with the results of the service types carried out and on the basis of evaluations defined in the core data, and is output to a customer as reports for the defined time periods.

9. A method for reading postal article inscriptions or document inscriptions, comprising the steps of:
    recording an image of the postal article or document;
    automatically reading the image with a single-stage or multistage process OCR devices;
    if reading results are not complete or unique, reading the images by coding forces in at least one video coding device, the device comprising two or more video coding stations which receive the images via a distribution device, the images being transmitted to the OCR devices or to the video coding devices together with data accompanying the images in order to carry out the step of reading with data relating to reading conditions and additional tasks;

supplying images from different customers together with data accompanying the images and relating to postal articles or documents to be read, storing core data relating to each customer such that it can be searched, the data including at least a source of the images, the scope of the agreed reading steps and further services as service types and, in a cost model, their costs as a function of defined image attributes, determining before each reading process, from data accompanying the images and core data, respective customer and respective reading task including image attributes which are required for cost determination, storing customer processing information relating to reading steps together with reading and processing results, determined image attributes, and data accompanying the images, such that they can be searched and sorted on a time-related basis after carrying out the reading process for each image, determining costs incurred from a cost model included in core data by means of the stored data relating to the reading processes carried out, storing the determined costs such that they can be sorted on the basis of service types of the cost model or on the basis of service time periods, and outputting the determined costs as invoices based on defined sorting criteria for each customer.

10. The method according to claim 9, further comprising the step of prioritizing the service types which are included in the core data with regard to processing including agreed processing time period for the customers.

11. The method according to claim 9, further comprising the steps of:

statistically processing the stored data with results from the service types carried out, the results corresponding to evaluations defined in the core data, and outputting the statistically processed data to the customers as reports for the defined time periods.

12. The method according to claim 11, wherein tags of the image-producing devices are stated in the data accompanying the images as the source of the images, and are in turn associated with the individual customers.

13. The method according to claim 11, wherein the images and the reading results are associated with the postal articles or documents by means of identification tags.

14. The method according to claim 11, wherein the address codes which have been verified by means of address directories are output as reading results of addresses.

15. A device for reading postal article inscriptions or document inscriptions by means of image recording devices, OCR devices and, if reading results are not complete or unique, at least one video coding device comprising two or more video coding stations at which the images which have not been successfully OCR-read and are assigned by a distribution device are read and coded by coding forces with the images being transmitted to the OCR devices or to the video coding devices together with data accompanying the images in order to carry out the reading tasks with the data relating to reading conditions and additional tasks, comprising:

means for supplying the images from different customers together with data accompanying the images and relating to postal articles or documents to be read, means for storing core data relating to each customer in a core databank such that it can be searched, the data including at least a source of the images, the scope of the agreed reading and processing steps, and further services as service types and, in a cost model, their costs on agreement as a function of defined image attributes, means for providing an evaluation device which determines a respective customer and respective reading task, including image attributes which are required for cost determination before each reading process, from the data accompanying the images and from the core data, means for storing in a service databank the customer and processing information relating to the reading and processing steps together with the reading and processing results, the determined image attributes and the data accompanying the images such that they can be searched and sorted on a time-related basis for each image, means for determining costs incurred in the evaluation device from the cost model contained in the core data databank by means of the stored data relating to the reading processes carried out, means for storing the costs such that they can be sorted on a basis of cost model service types and service time periods, and means for outputting the costs as invoices based on defined sorting criteria for each customer.

16. The device according to claim 15, wherein the evaluation device is designed such that the stored data is processed statistically with the results of the service types carried out and on the basis of evaluations defined in the core data, and is output to a customer as reports for the defined time periods.

* * * * *